United States Patent
Huang

(10) Patent No.: US 9,581,755 B2
(45) Date of Patent: Feb. 28, 2017

(54) REFLECTIVE DISPLAY APPARATUS AND MANUFACTURING METHOD OF REFLECTIVE DISPLAY APPARATUS

(71) Applicant: E Ink Holdings Inc., Hsinchu (TW)

(72) Inventor: Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 169 days.

(21) Appl. No.: 14/267,928

(22) Filed: May 2, 2014

(65) Prior Publication Data

US 2015/0103393 A1 Apr. 16, 2015

(30) Foreign Application Priority Data

Oct. 14, 2013 (TW) .............................. 102136990 A

(51) Int. Cl.
*G02B 26/00* (2006.01)
*G02B 27/00* (2006.01)
(Continued)

(52) U.S. Cl.
CPC ........... *G02B 6/0065* (2013.01); *G02B 6/005* (2013.01); *G02F 1/1336* (2013.01); *G02B 1/18* (2015.01); *G02B 3/0006* (2013.01); *G02B 6/0011* (2013.01); *G02B 6/0016* (2013.01); *G02B 6/0018* (2013.01); *G02B 6/0023* (2013.01); *G02B 6/0031* (2013.01);
(Continued)

(58) Field of Classification Search
CPC .. G02B 6/0073; G02B 6/0091; G02B 6/0031; G02B 6/0055; G02B 6/0088; G02B 6/0051; G02B 6/0035; G02B 6/0011; G02B 6/0018; G02B 6/0083; G02B 6/0016; G02B 6/0023; G02B 6/0038; G02B 6/0081; G02B 1/18; G02B 2006/12159; G02B 3/0006; G02F 2001/1678; G02F 1/172; G02F 1/13306; G02F 2001/1672; G02F 1/0121; G02F 1/161; G02F 2001/133607; G02F 2202/01; G02F 2202/36; G02F 2203/026
USPC ....... 359/296, 592–595, 597, 598, 615, 619, 359/627; 385/4, 8, 10; 345/107, 108, 50, 345/87, 104, 105; 349/61–63, 68; 362/603, 608, 609, 610, 611–629, 633, 362/297, 310
See application file for complete search history.

(56) References Cited

U.S. PATENT DOCUMENTS

| 5,995,690 A | 11/1999 | Kotz et al. |
| 7,916,130 B2 * | 3/2011 | Yamazaki ......... G02F 1/133603 345/102 |

(Continued)

FOREIGN PATENT DOCUMENTS

| TW | M352038 | 3/2009 |
| TW | 201241505 | 10/2012 |

Primary Examiner — Evelyn A Lester
(74) Attorney, Agent, or Firm — Jianq Chyun IP Office

(57) ABSTRACT

A reflective display apparatus including at least one front-light module, a first frame, a first liquid, and a display unit is provided. The at least one front-light module includes a light source and a light guide plate. The light source is adapted for providing an illumination beam. The first frame connects with the light guide plate of the at least one front-light module. The display unit, the first frame, the at least one front-light module form a first containing space and the first liquid is injected into the first containing space. Besides, a manufacturing method of the reflective display apparatus is also provided.

24 Claims, 2 Drawing Sheets

(51) Int. Cl.
  G09G 3/34 (2006.01)
  F21V 7/04 (2006.01)
  F21V 8/00 (2006.01)
  *G02F 1/133* (2006.01)
  *G02B 6/12* (2006.01)
  *G02F 1/01* (2006.01)
  *G02F 1/17* (2006.01)
  *G02F 1/1335* (2006.01)
  *G02F 1/161* (2006.01)
  *G02F 1/167* (2006.01)
  *G02B 3/00* (2006.01)
  *G02B 1/18* (2015.01)
  *G02F 1/1333* (2006.01)

(52) U.S. Cl.
  CPC .......... *G02B 6/0035* (2013.01); *G02B 6/0038* (2013.01); *G02B 6/0051* (2013.01); *G02B 6/0055* (2013.01); *G02B 6/0073* (2013.01); *G02B 6/0081* (2013.01); *G02B 6/0083* (2013.01); *G02B 6/0088* (2013.01); *G02B 6/0091* (2013.01); *G02B 2006/12159* (2013.01); *G02F 1/0121* (2013.01); *G02F 1/13306* (2013.01); *G02F 1/161* (2013.01); *G02F 1/167* (2013.01); *G02F 1/172* (2013.01); *G02F 2001/133342* (2013.01); *G02F 2001/133607* (2013.01); *G02F 2001/133616* (2013.01); *G02F 2001/1672* (2013.01); *G02F 2001/1678* (2013.01); *G02F 2202/01* (2013.01); *G02F 2202/36* (2013.01); *G02F 2203/026* (2013.01); *Y10T 29/49002* (2015.01)

(56) References Cited

U.S. PATENT DOCUMENTS

| | | |
|---|---|---|
| 2003/0202135 A1 | 10/2003 | Ono et al. |
| 2008/0278658 A1 | 11/2008 | Kim et al. |
| 2011/0007380 A1 | 1/2011 | Chen |
| 2013/0063967 A1 | 3/2013 | Luo et al. |
| 2015/0003104 A1* | 1/2015 | Huang .................. G02B 6/005 362/606 |

* cited by examiner

REFLECTIVE DISPLAY APPARATUS AND MANUFACTURING METHOD OF REFLECTIVE DISPLAY APPARATUS

CROSS-REFERENCE TO RELATED APPLICATION

This application claims the priority benefit of Taiwan application serial no. 102136990, filed on Oct. 14, 2013. The entirety of the above-mentioned patent application is hereby incorporated by reference herein and made a part of this specification.

BACKGROUND OF THE INVENTION

Field of the Invention

The invention relates to a display apparatus and a manufacturing method thereof and particularly relates to a reflective display apparatus and a manufacturing method thereof.

Description of Related Art

A primary function of a light source module is to serve as a light source of a display device. The basic principle is to convert effective light of the used linear light source or point light source into a planar light source having high luminance and favorable uniformity through a light guide plate. Generally speaking, light source modules may be divided into two types, namely front-light modules and back-light modules, wherein front-light modules are mainly used by reflective display devices, such as an electrophoretic display (EPD) panel or a reflective display medium.

However, the current manufacturing process for assembling a front-light module to a reflective display apparatus or reflective display medium requires use of a large-scale bonding process, such as optically clear adhesive (OCA) bonding process or optical clear resin (OCR) bonding process. Such manufacturing processes are costly, and the bonding materials used in the processes are expensive as well. Moreover, it is not easy to achieve large-area production. In addition, the current design of front-light module hardly satisfies the requirements for application of free curved surfaces.

SUMMARY OF THE INVENTION

The invention provides a reflective display apparatus that can be easily manufactured with low production costs.

The invention provides a manufacturing method of a reflective display apparatus for simplifying the manufacturing steps and lowering the production costs.

The reflective display apparatus of the invention includes at least a front-light module, a first frame, a first liquid, and a display unit. The at least one front-light module includes a light source and a light guide plate. The light source is adapted for providing an illumination beam. The first frame connects with the light guide plate of the at least one front-light module. The display unit, the first frame, the at least one front-light module form a first containing space and the first liquid is disposed in the first containing space.

The manufacturing method of the invention includes the following steps. A light guide plate is provided. A light source is disposed beside the light guide plate. A first frame is disposed and connected with the light guide plate of at least one front-light module. A display unit is disposed so that the display unit, the first frame, and the at least one front-light module form a first containing space. A first liquid is disposed in the first containing space.

In an embodiment of the invention, the light guide plate includes an incident surface, a first surface, and a second surface. The first surface and the second surface are opposite to each other. The incident surface connects the first surface and the second surface. The first surface faces toward the display unit. The light source is disposed beside the incident surface of the light guide plate, and an illumination beam enters the light guide plate via the incident surface.

In an embodiment of the invention, the light guide plate further includes a plurality of optical micro-structures disposed on the first surface.

In an embodiment of the invention, the reflective display apparatus further includes a second frame, a protection plate, and a second liquid. The second frame is disposed on the second surface of the light guide plate. The protection plate is connected with the second frame, wherein the second frame and the light guide plate form a second containing space. The second liquid is disposed in the second containing space.

In an embodiment of the invention, the number of the at least one front-light module is one, and the first frame is disposed on the first surface of the light guide plate.

In an embodiment of the invention, the number of the at least one front-light module is two, and the first frame is connected with the light guide plate of the two front-light modules to form the first containing space.

In an embodiment of the invention, the display unit is a double-sided display unit, and the display unit includes two electrophoretic display layers (Front Plane Laminate, FPL), a first electrode layer, and two second electrode layers. The first electrode layer is disposed between the two electrophoretic display layers and includes a plurality of first electrodes. The first electrodes are disposed on two sides of the first electrode layer to respectively face toward each first surface of the two front-light modules. The second electrode layers include a plurality of second electrodes, wherein each of the electrophoretic display layers is disposed between the first electrode layer and one of the second electrode layers.

In an embodiment of the invention, each of the electrophoretic display layers includes a display base material and a plurality of display particles. The display base material is disposed between the first electrode layer and the second electrode layers, wherein the second electrodes are disposed on a side of the second electrode layer, which faces the display base material. The display particles are distributed in the display base material.

In an embodiment of the invention, a ratio of refractive indexes of the light guide plate and the first liquid ranges from 1.02 to 1.20.

In an embodiment of the invention, the first liquid is glycerin, water, or a solution of mixture of water and glycol in any proportion.

In an embodiment of the invention, the first liquid contains electrolyte.

In an embodiment of the invention, the first frame has at least one injection hole thereon for injecting the first liquid.

In an embodiment of the invention, the display unit is an electronic paper display.

In an embodiment of the invention, the first frame is a resin frame.

In an embodiment of the invention, the manufacturing method of the reflective display apparatus further includes the following steps. A second frame is disposed on the second surface of the light guide plate. A protection plate is disposed to be connected with the second frame, so that the second frame and the light guide plate form a second containing space. A second liquid is disposed in the second containing space.

In an embodiment of the invention, the number of the at least one front-light module is one, and a method of connecting the first frame and the light guide plate of the at least one front-light module further includes: disposing the first frame on the first surface of the light guide plate.

In an embodiment of the invention, the number of the at least one front-light module is two, and the method of connecting the first frame and the light guide plate of the at least one front-light module further includes: connecting the first frame and the light guide plate of the two front-light modules to form the first containing space.

In an embodiment of the invention, the first frame has at least one injection hole thereon, and a method of disposing the first liquid in the first containing space includes injecting the first liquid via the at least one injection hole.

Based on the above, according to the reflective display apparatus and the manufacturing method in the embodiments of the invention, a liquid-state interface material (i.e. the first liquid) is used to replace the optical adhesive or optical transparent resin used in the conventional front-light module manufacturing technique, thereby simplifying the manufacturing processes and reducing the production costs. Moreover, the embodiments of the invention are applicable to large-sized displays or displays having free curved surfaces and thus are not limited by the sizes and shapes of the displays.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1A:
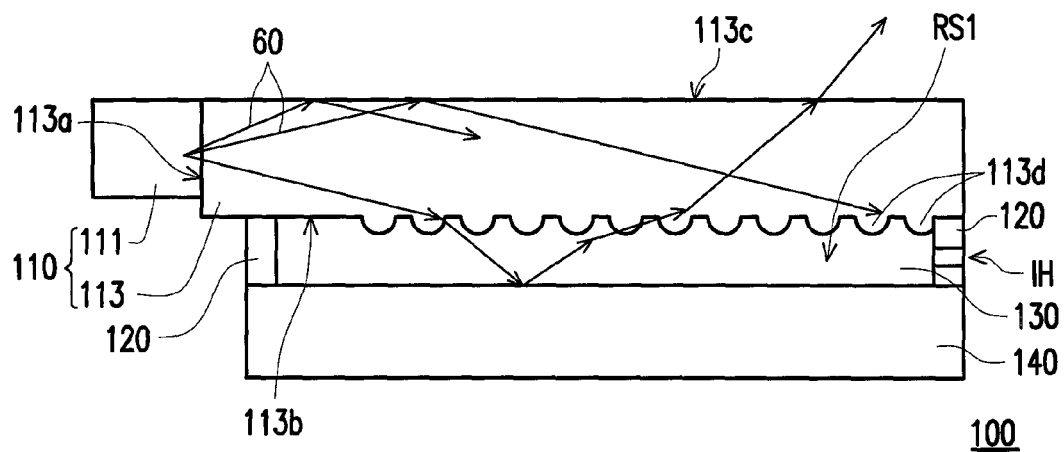
FIG. 1A is a schematic diagram of a reflective display apparatus in an embodiment of the invention.

FIG. 1A is a schematic diagram of a reflective display apparatus in an embodiment of the invention. With reference to FIG. 1A, in this embodiment, a reflective display apparatus 100 includes at least one front-light module 110, a first frame 120, a first liquid 130, and a display unit 140. The at least one front-light module 110 includes a light source 111 and a light guide plate 113. For example, in this embodiment, the first frame 120 is a resin frame, and the display unit 140 may be an electronic paper display. However, the invention is not limited thereto. In other embodiments, the display unit 140 may be a liquid crystal on silicon (LCOS) display device or a large-sized reflective display medium.

More specifically, in this embodiment, the first frame 120 is connected with the light guide plate 113 of the at least one front-light module 110. Moreover, the display unit 140, the first frame 120, and the at least one front-light module 110 form a first containing space RS1, and the first liquid 130 is disposed in the first containing space RS1. To be more detailed, in this embodiment, the first liquid 130 fills the first containing space RS1, for example. A manufacturing method of the reflective display apparatus 100 is described in detail below.

For example, in this embodiment, the manufacturing method of the reflective display apparatus 100 includes the following steps. First, the light guide plate 113 is provided, and the light source 111 is disposed beside the light guide plate 113. Next, the first frame 120 is disposed to be connected with the light guide plate 113 of the at least one front-light module 110. More specifically, in this embodiment, the light guide plate 113 includes an incident surface 113a, a first surface 113b, and a second surface 113c, wherein the first surface 113b and the second surface 113c of the light guide plate 113 are opposite to each other. The incident surface 113a connects the first surface 113b and the second surface 113c. The first surface 113b faces toward the display unit 140. A method of connecting the first frame 120 and the light guide plate 113 of the at least one front-light module 110 further includes disposing the first frame 120 on the first surface 113b of the light guide plate 113.

In addition, the display unit 140 is disposed on the first frame 120. In this embodiment, because the first frame 120 is disposed on the first surface 113b of the light guide plate 113, the display unit 140, the first frame 120, and the at least one front-light module 110 form the first containing space RS1. Then, the first liquid 130 is disposed in the first containing space RS1. More specifically, as shown in FIG. 1A, in this embodiment, the first frame 120 has at least one injection hole IH thereon for injecting the first liquid 130. In other words, in this embodiment, a method of disposing the first liquid 130 in the first containing space RS1 includes injecting the first liquid 130 via the injection hole IH, so as to fill the first containing space RS1 with the first liquid 130. However, the invention is not limited thereto. According to the above, the reflective display apparatus 100 of FIG. 1A is formed.

Further, as shown in FIG. 1A, in this embodiment, the light source 111 is disposed beside the incident surface 113a of the light guide plate 113 and is adapted for providing an illumination beam 60, which enters the light guide plate 113 via the incident surface 113a. Furthermore, in this embodiment, the light guide plate 113 further includes a plurality of optical micro-structures 113d on the first surface 113b. In further detail, as shown in FIG. 1A, when the illumination beam 60 enters the light guide plate 113 via the incident surface 113a, the illumination beam 60 is transmitted in the light guide plate 113 and reflected by the second surface 113c of the light guide plate 113 to the display unit 140 by the optical micro-structures 113d. The optical micro-structures 113d may be formed to have required shapes during the manufacturing processes, so as to satisfy the requirements for application of a free curved surface, such that the front-light module 110 provides the display unit 140 a planar light source 111 having high luminance and favorable uniformity. Moreover, in this embodiment, a patterned region (not shown) may be selectively formed on the second surface 113c of the light guide plate 113, so as to increase the amount of the illumination beam 60 reflected to the display unit 140.

In addition to the above, in this embodiment, a ratio of a refractive index of the light guide plate 113 to a refractive index of the first liquid 130 ranges from 1.02 to 1.20. For example, in this embodiment, the first liquid 130 may be glycerin or water. To be more specific, if the first liquid 130 is glycerin, a material of the light guide plate 113 may be a polycarbonate (PC) resin, wherein a refractive index of glycerin is 1.47 and a refractive index of the polycarbonate resin is 1.58. Therefore, the ratio of the refractive indexes of the light guide plate 113 and the first liquid 130 is 1.07 in this case. On the other hand, if the first liquid 130 is water, the material of the light guide plate 113 may be polymethyl methacrylate (PMMA), wherein a refractive index of water is 1.33 and a refractive index of polymethyl methacrylate is 1.48. Therefore, the ratio of the refractive indexes of the light guide plate 113 and the first liquid 130 is 1.11. It should be noted that the aforementioned value ranges are merely examples and should not be construed as limitations to the invention. In other embodiments, the first liquid 130 may be a solution of mixture of water and glycol in any proportion or a solution containing electrolyte, or be used with the light guide plate 113 of a different material, so that the ratio of the refractive indexes of the light guide plate 113 and the first liquid 130 ranges from 1.02 to 1.20.

Below the relationship between the ratio of the refractive indexes of the light guide plate 113 and the first liquid 130, a display contrast, and luminance is further explained with reference to FIG. 1B.

Figure 1B:
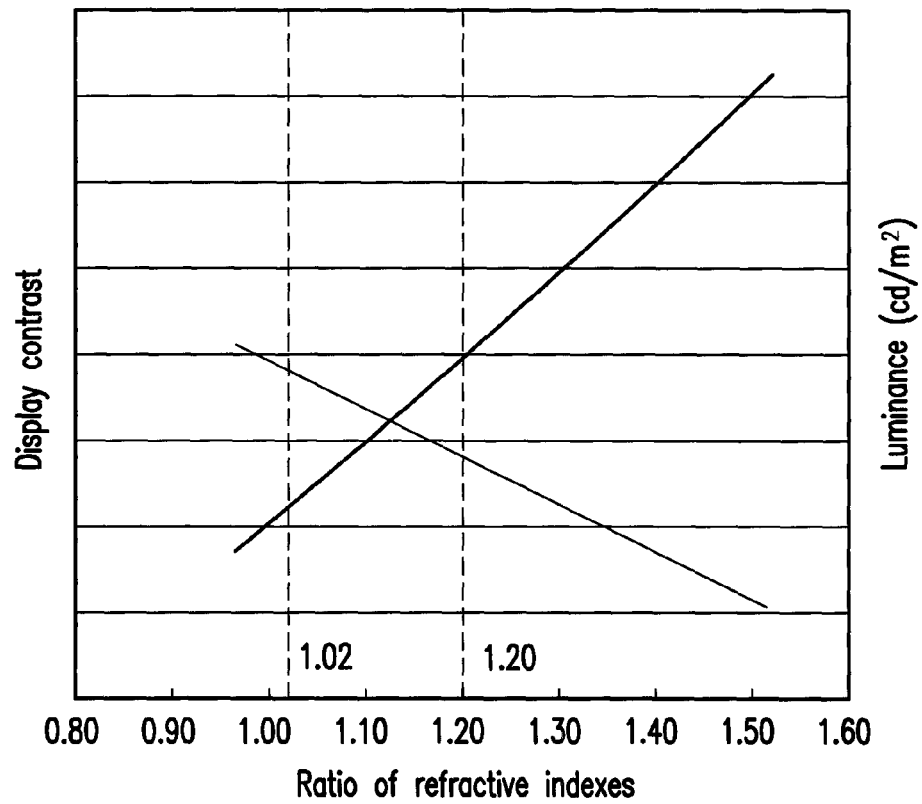
FIG. 1B is a chart showing a ratio of refractive indexes of a light guide plate and a first liquid of FIG. 1A.

FIG. 1B is a chart showing the ratio of the refractive indexes of the light guide plate 113 and the first liquid 130 of FIG. 1A. As shown in FIG. 1B, in this embodiment, when the ratio of the refractive index of the light guide plate 113 to the refractive index of the first liquid 130 approximates to 1, the display unit 140 has a better display contrast effect, but the front-light module 110 has poor luminance relative to the display unit 140. On the contrary, as the ratio of the refractive indexes of the light guide plate 113 and the first liquid 130 increases, the luminance of the front-light module 110 is improved, but the display contrast effect of the display unit 140 decreases. Therefore, in order to balance the display contrast effect and the light emitting efficiency, in this embodiment, the ratio of the refractive indexes of the light guide plate 113 and the first liquid 130 of the reflective display apparatus 100 is controlled in a range from 1.02 to 1.20.

Accordingly, in this embodiment, the reflective display apparatus 100 uses a liquid-state interface material (i.e. the first liquid 130) to replace the optical adhesive or optical transparent resin used in the conventional front-light module manufacturing technique, so as to simplify the manufacturing processes and reduce the production costs. Moreover, the reflective display apparatus 100 further controls the ratio of the refractive indexes of the light guide plate 113 and the first liquid 130 in a range from 1.02 to 1.20, so that the front-light module 110 of the reflective display apparatus 100 provides the display unit 140 with the planar light source 111 having high luminance and favorable uniformity while maintains favorable display contrast effect.

In addition, the aforementioned reflective display apparatus 100 for example has the first containing space RS1 for disposing the first liquid 130, but the invention is not limited thereto. In other embodiments, a plurality of different containing spaces may be disposed and different liquids may be respectively injected in the containing spaces, which will be described below with reference to FIG. 2.

Figure 2:
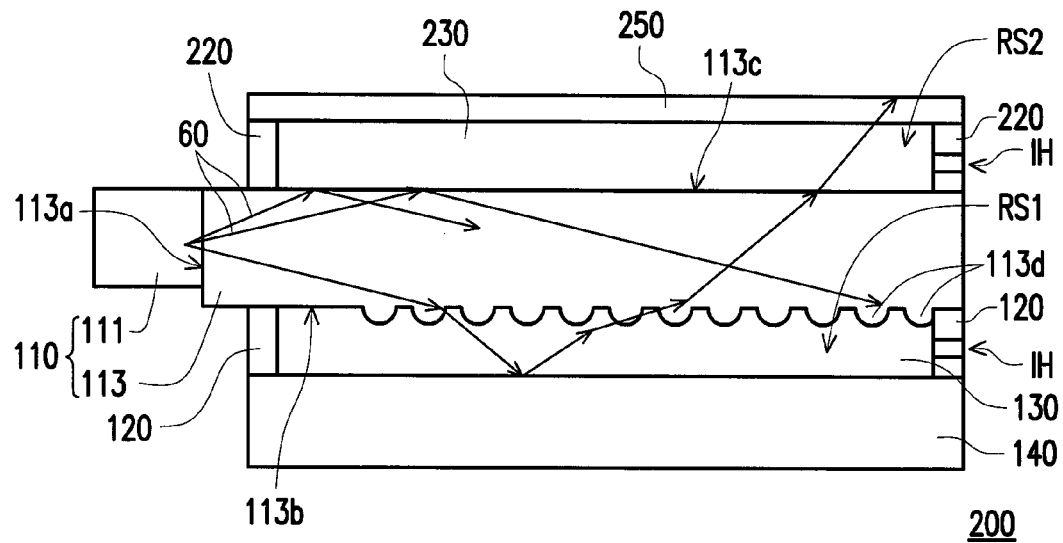
FIG. 2 is a schematic diagram of a reflective display apparatus in another embodiment of the invention.

FIG. 2 is a schematic diagram of a reflective display apparatus in another embodiment of the invention. With reference to FIG. 2, in this embodiment, a reflective display apparatus 200 of FIG. 2 is similar to the reflective display apparatus 100 of FIG. 1A, and a difference therebetween is be described below. More specifically, as shown in FIG. 2, in this embodiment, the reflective display apparatus 200 further includes a second frame 220, a protection plate 250, and a second liquid 230. In further detail, the second frame 220 is disposed on the second surface 113c of the light guide plate 113. The protection plate 250 is connected with the second frame 220, wherein the second frame 220 and the light guide plate 113 form a second containing space RS2, and the second liquid 230 is disposed in the second containing space RS2. To be more specific, in this embodiment, the second liquid 230 fills the second containing space RS2 for example.

For instance, in this embodiment, a manufacturing method of the reflective display apparatus 200 further includes the following steps. The second frame 220 is disposed on the second surface 113c of the light guide plate 113, and the protection plate 250 is disposed to be connected with the second frame 220. Accordingly, the second frame 220 and the light guide plate 113 form the second containing space RS2. Next, in this embodiment, the second frame 220 also has at least one injection hole IH thereon, and the second liquid 230 is injected into the second containing space RS2 so as to fill the second containing space RS2. To be more specific, in this embodiment, a ratio of refractive indexes of the light guide plate 113 and the second liquid 230 also ranges from 1.02 to 1.20. The first liquid 130 and the second liquid 230 may be the same or different materials. The invention is not limited thereto. Moreover, in this embodiment, a patterned region (not shown) may be selectively formed on the protection plate 250, so as to increase the amount of the illumination beam 60 reflected to the display unit 140.

Accordingly, the front-light module 110 of the reflective display apparatus 200 also provides the display unit 140 the planar light source 111 having high luminance and favorable uniformity, and the reflective display apparatus 200 still maintains favorable display contrast effect. In other words, the reflective display apparatus 200 achieves the same effect as the reflective display apparatus 100 and has similar functions and advantages, which will not be repeated here.

Although there is only one front-light module 110 in the above description, the invention is not limited thereto. In other embodiments, the number of the front-light modules 110 may be plural, which will be described below with reference to FIG. 3.

Figure 3:
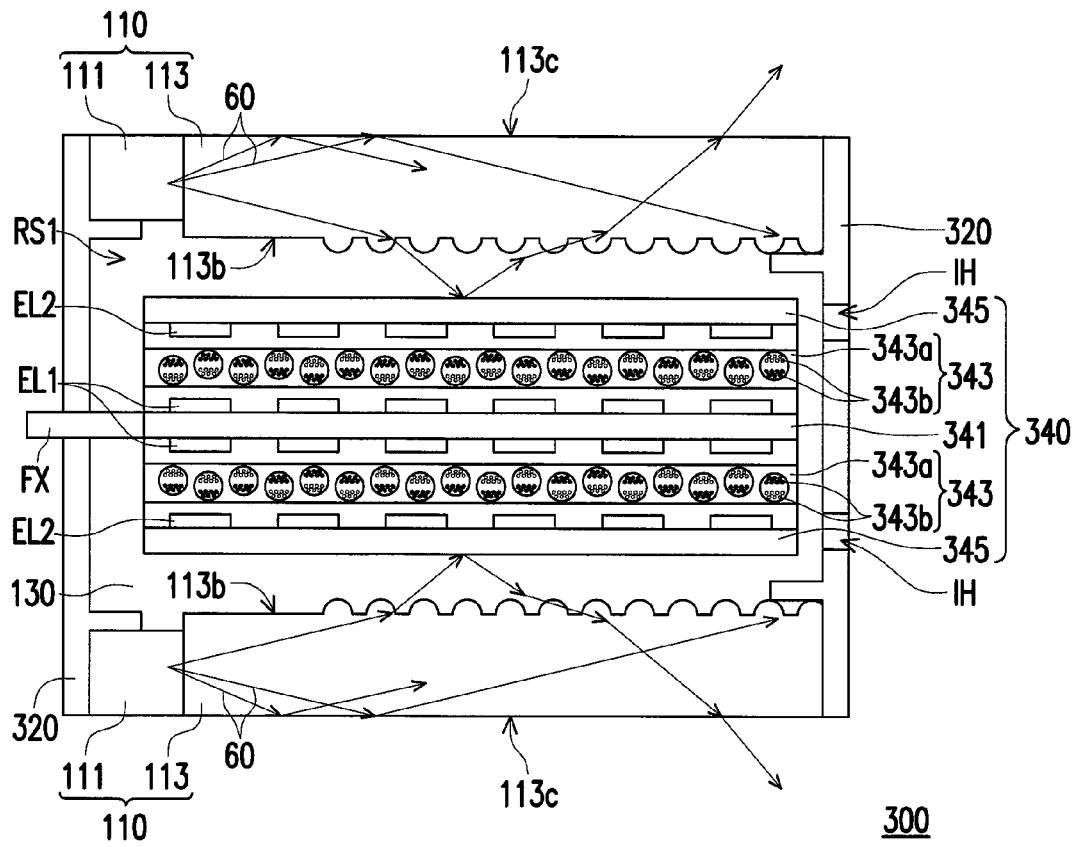
FIG. 3 is a schematic diagram of a reflective display apparatus in yet another embodiment of the invention.

FIG. 3 is a schematic diagram of a reflective display apparatus in yet another embodiment of the invention. With reference to FIG. 3, in this embodiment, a reflective display apparatus 300 of FIG. 3 is similar to the reflective display apparatus 100 of FIG. 1A, and a difference therebetween is described below. More specifically, as shown in FIG. 3, in this embodiment, the reflective display apparatus 300 is a reflective display apparatus capable of providing a double-sided display function, wherein the number of the at least one front-light module 110 is two, and a first frame 320 is connected with the light guide plates 113 of two front-light modules 110. In other words, in the steps of the manufacturing method of the reflective display apparatus 300, when the first frame 320 is disposed, the first frame 320 is connected with the light guide plates 113 of two front-light modules 110, so as to form the first containing space RS1. Moreover, in this embodiment, a display unit 340 is further fixed on the first frame 320 by a fixing member FX.

Furthermore, as shown in FIG. 3, in this embodiment, the display unit 340 is a double-sided display unit and includes a first electrode layer 341, two electrophoretic display layers 343, and two second electrode layers 345. To be more specific, the first electrode layer 341 is disposed between the two electrophoretic display layers 343 and includes a plurality of first electrodes EL1. The first electrodes EL1 are disposed on two sides of the first electrode layer 341 and respectively face toward each first surface 113b of the two front-light modules 110. The second electrode layers 345 include a plurality of second electrodes EL2, and each of the electrophoretic display layers 343 is disposed between the first electrode layer 341 and one of the two second electrode layers 345.

For example, in this embodiment, each of the electrophoretic display layers 343 may be a micro-capsular electrophoretic display layer or a micro-cup electrophoretic display layer. To make the disclosure more comprehensible, the micro-capsular electrophoretic display layer is illustrated in FIG. 3 as an example. However, it should be noted that the invention is not limited thereto. To be more specific, as shown in FIG. 3, in this embodiment, each of the electrophoretic display layers 343 includes a display base material 343a and a plurality of display particles 343b. The display base material 343a is disposed between the first electrode layer 341 and the second electrode layers 345, wherein the second electrodes EL2 are disposed on a side of the second electrode layer 345, which faces the display base material 343a. In addition, the electrophoretic display layers 343 package display particles 343b of different colors (e.g. black and white) in micro-capsular structures and the display particles 343b are distributed in the display base material 343a. Moreover, the electrophoretic display layers 343 utilize the distribution of the display particles 343b in each of the micro-capsular structures to control reflection of an external light so as to achieve display. Accordingly, with the configuration of the two electrophoretic display layers 343, the display unit 340 is capable of providing the double-sided display function.

In addition, in this embodiment, because the ratio of the refractive indexes of the light guide plate 113 and the first liquid 130 ranges from 1.02 to 1.20, the front-light module 110 of the reflective display apparatus 300 also provides the display unit 340 the planar light source 111 having high luminance and favorable uniformity, and the reflective display apparatus 300 still maintains favorable display contrast effect. In other words, the reflective display apparatus 300 achieves the same effect as the reflective display apparatus 110 and has similar functions and advantages, which will not be repeated here.

To conclude the above, according to the reflective display apparatus and the manufacturing method in the above embodiments of the invention, a liquid-state interface material (i.e. the first liquid) is used to replace the optical adhesive or optical transparent resin used in the conventional front-light module manufacturing technique, thereby simplifying the manufacturing processes and reducing the production costs. Moreover, the reflective display apparatus controls the ratio of the refractive indexes of the light guide plate and the first liquid in a range from 1.02 to 1.20, so that the front-light module of the reflective display apparatus is capable of providing the display unit with the planar light source having high luminance and favorable uniformity while maintaining favorable display contrast effect. In addition, in the reflective display apparatus, the shapes of the optical micro-structures of the light guide plate are designed to be applicable to large-sized displays or displays having free curved surfaces and thus the invention is not limited by the sizes and shapes of the displays.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A reflective display apparatus, comprising:
    at least a front-light module, comprising:
        a light source, adapted for providing an illumination beam; and
        a light guide plate;
    a first frame connected with the light guide plate of the at least one front-light module;
    a first liquid, wherein the first liquid comprises electrolyte, glycerin, water, or a solution of mixture of water and glycol in any proportion; and
    a display unit, wherein the display unit, the first frame, and the at least one front-light module form a first containing space, and the first liquid is disposed in the first containing space.

2. The reflective display apparatus according to claim 1, wherein the light guide plate comprises an incident surface, a first surface, and a second surface, wherein the first surface and the second surface are opposite to each other; the incident surface connects the first surface and the second surface; the first surface faces toward the display unit; the light source is disposed beside the incident surface of the light guide plate; and the illumination beam enters the light guide plate via the incident surface.

3. The reflective display apparatus according to claim 2, wherein the light guide plate further comprises a plurality of optical micro-structures disposed on the first surface.

4. The reflective display apparatus according to claim 2, further comprising:
    a second frame disposed on the second surface of the light guide plate;
    a protection plate connected with the second frame, wherein the second frame and the light guide plate form a second containing space; and
    a second liquid disposed in the second containing space.

5. The reflective display apparatus according to claim 2, wherein the number of the at least one front-light module is one, and the first frame is disposed on the first surface of the light guide plate.

6. The reflective display apparatus according to claim 2, wherein the number of the at least one front-light module is two, and the first frame is connected with the light guide plate of the two front-light modules to form the first containing space.

7. The reflective display apparatus according to claim 6, wherein the display unit is a double-sided display unit, and the display unit comprises:
    two electrophoretic display layers;
    a first electrode layer disposed between the two electrophoretic display layers and comprising a plurality of first electrodes disposed on two sides of the first electrode layer to respectively face each of first surfaces of the two front-light modules; and
    two second electrode layers comprising a plurality of second electrodes, wherein each of the electrophoretic display layers is disposed between the first electrode layer and one of the second electrode layers.

8. The reflective display apparatus according to claim 7, wherein each of the electrophoretic display layers comprises:
    a display base material disposed between the first electrode layer and the second electrode layer, wherein the second electrodes are disposed on a side of the second electrode layer, which faces the display base material; and a plurality of display particles distributed in the display base material.

9. The reflective display apparatus according to claim 1, wherein a ratio of a refractive index of the light guide plate to a refractive index of the first liquid ranges from 1.02 to 1.20.

10. The reflective display apparatus according to claim 1, wherein the first frame has at least an injection hole thereon for injecting the first liquid.

11. The reflective display apparatus according to claim 1, wherein the display unit is an electronic paper display.

12. The reflective display apparatus according to claim 1, wherein the first frame is a resin frame.

13. A manufacturing method of a reflective display apparatus, the manufacturing method comprising:
    providing a light guide plate;
    disposing a light source beside the light guide plate;
    disposing a first frame and connecting the first frame with the light guide plate of at least one front-light module;
    disposing a display unit, wherein the display unit, the first frame, and the at least one front-light module form a first containing space; and
    disposing a first liquid in the first containing space, wherein the first liquid comprises electrolyte, glycerin, water, or a solution of mixture of water and glycol in any proportion.

14. The manufacturing method according to claim 13, wherein the light guide plate comprises an incident surface, a first surface, and a second surface, wherein the first surface and the second surface are opposite to each other; the incident surface connects the first surface and the second surface; the first surface faces toward the display unit; the light source is disposed beside the incident surface of the light guide plate to provide an illumination beam; and the illumination beam enters the light guide plate via the incident surface.

15. The manufacturing method according to claim 14, wherein the light guide plate further comprises a plurality of optical micro-structures disposed on the first surface.

16. The manufacturing method according to claim 14, further comprising:
    disposing a second frame on the second surface of the light guide plate;
    disposing a protection plate to be connected with the second frame, so that the second frame and the light guide plate form a second containing space; and
    disposing a second liquid in the second containing space.

17. The manufacturing method according to claim 14, wherein the number of the at least one front-light module is one, and a method of connecting the first frame and the light guide plate of the at least one front-light module further comprises: disposing the first frame on the first surface of the light guide plate.

18. The manufacturing method according to claim 14, wherein the number of the at least one front-light module is two, and the method of connecting the first frame and the light guide plate of the at least one front-light module further comprises: connecting the first frame and the light guide plate of the two front-light modules to form the first containing space.

19. The manufacturing method according to claim 18, wherein the display unit is a double-sided display unit, and the display unit comprises:
    two electrophoretic display layers;
    a first electrode layer disposed between the two electrophoretic display layers and comprising a plurality of first electrodes disposed on two sides of the first electrode layer to respectively face each of first surfaces of the two front-light modules; and
    two second electrode layers comprising a plurality of second electrodes, wherein each of the electrophoretic display layers is disposed between the first electrode layer and one of the second electrode layers.

20. The manufacturing method according to claim 19, wherein each of the electrophoretic display layers comprises:
    a display base material disposed between the first electrode layer and the second electrode layer, wherein the second electrodes are disposed on a side of the second electrode layer, which faces the display base material; and
    a plurality of display particles distributed in the display base material.

21. The manufacturing method according to claim 13, wherein a ratio of a refractive index of the light guide plate to a refractive index of the first liquid ranges from 1.02 to 1.20.

22. The manufacturing method according to claim 13, wherein the first frame has at least an injection hole thereon, and a method of disposing the first liquid in the first containing space comprises:
    injecting the first liquid via the at least one injection hole.

23. The manufacturing method according to claim 13, wherein the display unit is an electronic paper display.

24. The manufacturing method according to claim 13, wherein the first frame is a resin frame.

* * * * *